United States Patent

Avins

[15] 3,667,060

[45] May 30, 1972

[54] BALANCED ANGLE MODULATION DETECTOR

[72] Inventor: Jack Avins, Princeton, N.J.

[73] Assignee: RCA Corporation

[22] Filed: Aug. 26, 1970

[21] Appl. No.: 66,945

[52] U.S. Cl. ..............................329/103, 307/233, 325/347, 325/476, 328/169, 329/50, 329/133

[51] Int. Cl. ..........................................................H03d 3/02

[58] Field of Search ................................329/131–134, 103, 329/145, 30, 120, 124, 125; 328/171, 173, 169, 170; 325/347, 473–476; 307/233

[56] References Cited

UNITED STATES PATENTS

| | | | |
|---|---|---|---|
| 3,500,217 | 3/1970 | Allen | 307/233 X |
| 3,508,161 | 4/1970 | Bingham | 329/124 X |
| 3,548,326 | 12/1970 | Bilotti | 330/30 D X |
| 3,241,078 | 3/1966 | Jones | 330/30 D X |
| 3,519,841 | 7/1970 | Leinfelder | 329/50 X |
| 3,519,944 | 7/1970 | Avins | 329/103 |

*Primary Examiner*—Alfred L. Brody
*Attorney*—E. M. Whitacre

[57] ABSTRACT

A balanced angle modulation detector having first and second angle modulation wave transmission circuits comprising; a differential limiter, balanced switching means, and a single tuned circuit for generating a quadrature signal wave such that a linear discriminator characteristic is obtained. One of the transmission circuits comprises a phase lag network including a resistor and inductor connected in series coupled to an inductor and capacitor connected in parallel. The quadrature signal wave voltage, developed across the tuned circuit, is coupled with the in-phase signal wave voltage to the input electrodes of a balanced switching device whereby the modulating signal information is recovered from the angle modulated wave.

13 Claims, 5 Drawing Figures

INVENTOR
Jack Avins
BY Martin Sachs
ATTORNEY

INVENTOR.
Jack Avins
BY Martin Sachs
ATTORNEY

BALANCED ANGLE MODULATION DETECTOR

This invention relates to angle modulation systems and more particularly to angle modulation systems suited for fabrication on a monolithic integrated circuit structure.

As used herein, the term angle modulation refers to frequency or phase modulated waves or waves modulated in both frequency and phase and for the purpose of this description will be referred to as frequency modulation or FM. The term integrated circuit refers to a unitary or monolithic semiconductor structure or chip incorporating the equivalent of a network of interconnected active and passive electrical circuit elements such as transistors, diodes, resistors, capacitors, and the like.

In the design of angle modulation detector networks, the designer is confronted with the problem of obtaining detection of the angle modulation signal wave while introducing a minimum of amplitude modulation (AM) noise. Various techniques have been utilized to reduce the amount of AM recovered when an angle or frequency modulated (FM) signal wave is subjected to detection or demodulation.

When a quadrature detector circuit is used for detection of the frequency modulated signal wave, it is important that the reference and quadrature signal waves maintain their quadrature relationship to minimize the introduction of AM noise to the detected signal. The frequency modulated signal wave is usually processed by what is commonly referred to as limiting acting, to reduce the amplitude modulation noise appearing on the signal wave envelope. The complete removal of the amplitude modulation noise from the frequency modulated signal wave envelope is a continual design objective. In addition, balanced techniques are utilized in an attempt to obtain cancellation of the amplitude modulation noise on the frequency modulation envelope. A combination of these techniques are incorporated in the design of integrated circuits in the prior art.

The prior art quadrature detector frequently uses a leading phase shift for the quadrature signal which is obtained by a network that is primarily capacitive. Any phase shift lag introduced by the switching device itself is not compensated for and destroys a perfect quadrature relationship between the in-phase and quadrature signals. Furthermore, prior art quadrature detectors do not ensure that the time delay of the signal wave in the reference and quadrature signal paths are the same for all signal levels when they reach the switching device. In the preferred embodiment of the present invention, a balanced detector circuit utilizes a quadrature signal wave which is provided with a time delay equal to that acquired by the reference signal wave when it is coupled to the switching device. This insures a substantially quadrature relationship between the two signal waves, thereby reducing the amplitude modulation noise introduced to the detected signal.

In accordance with one embodiment of the invention, the angle modulation detection system includes a switching device having first, second and third electrodes, the first and second electrodes controlling the conductivity between the first and third electrodes. A source of angle modulated waves is coupled to the first and second electrodes being conveyed through a first and second angle modulation wave transmission circuit. In each of the first and second transmission circuits is introduced a substantially equal non-linear phase delay, the magnitude of which is a function of the amplitude of the angle modulated wave. Further phase shifting means is included in one of the first and second angle modulation transmission circuits for delaying the phase of the angle modulated wave conveyed therethrough such that a substantially quadrature relationship is maintained between the signals from the first and second angle modulation wave transmission as viewed from the third electrode.

The present invention may be incorporated in a circuit which is fabricated on an integrated circuit chip which measures approximately 80 mils by 80 mils and may be a portion of a complete FM receiver system. The integrated circuit chip may include, but is not limited to, an angle modulation detector, an intermediate frequency amplifier-limiter, an output amplifier, a signal-to-noise or hole detector circuit, a biasing power supply, and a tuning and signal strength circuit.

A complete understanding of the invention may be obtained from the following detailed description, when taken in conjunction with the accompanying drawings, in which.

Figure 1:
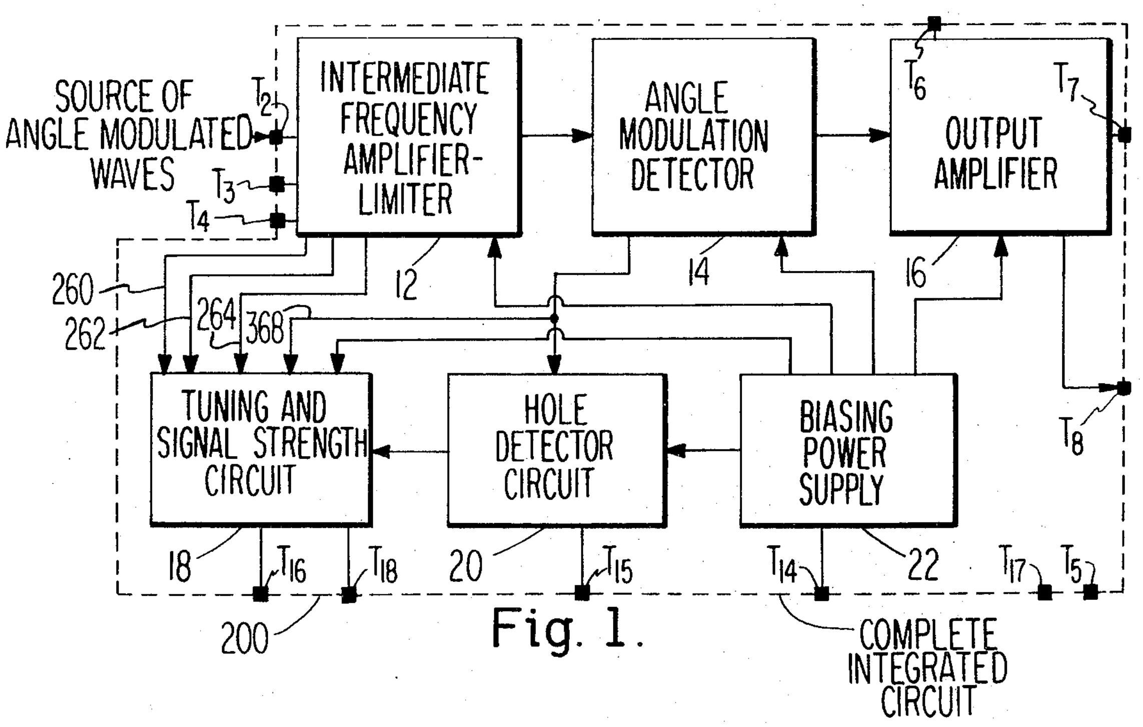
FIG. 1 is a functional block diagram of a monolithic integrated circuit chip including an angle modulation detector system embodying the present invention.

Referring to the drawings, FIG. 1 is a functional block diagram of a complete integrated circuit chip indicated by the dotted outline 200 wherein angle modulated waves are introduced to the integrated circuit chip at terminals T2 and T3. The integrated circuit chip 200 has a plurality of terminals T2–T18 located about its periphery for supplying inputs to and taking outputs from the chip. The angle modulated waves, which for the purpose of this description will be referred to as frequency modulated waves (FM), are amplified and limited by the intermediate frequency (IF) amplifier-limiter 12 which may include several translating amplifier stages.

The limiting function of IF amplifier-limiter 12 is to remove the amplitude modulation (AM) of the frequency modulated wave envelope. By way of example, the circuitry incorporated in the IF amplifier-limiter 12 of the integrated circuit chip 200 may be of the type described in my concurrently filed, copending application Ser. No. 66,921 filed Aug. 26, 1970, and assigned to the same assignee as the present invention.

Also arranged on the chip 200 is angle modulation detector 14 which is coupled to an output IF amplifier-limiter 12 to derive the modulation components from the amplified and limited wave and apply these components to an output amplifier 16. The output signal from the output amplifier 16 is coupled to terminal T7 of chip 200 and applied to suitable utilization means not shown. A second output signal from amplifier 16 is coupled to terminal T8 and provides an automatic frequency control (AFC) current which can be used to control the frequency of a local heterodyne oscillator, not shown, included in a signal wave receiver in which the integrated circuit chip 200 may be used. By way of example, circuitry incorporated in the output amplifier 16 may be of the type described in a concurrently filed, copending application Ser. No. 66,973 of Jack Craft filed Aug. 26, 1970 and assigned to the same assignee as this invention.

Each translating amplifier stage of IF amplifier-limiter 12 is also coupled to the tuning and signal strength circuit 18 via conductors 260, 262, and 264. The tuning and signal strength circuit 18 is further coupled to angle modulation detector 14, via conductor 368, and provides an AGC voltage at terminal T18, which may be coupled to a preceding RF or IF translating stage, not shown. An output voltage proportional to signal strength, for utilization by a tuning indicator, not shown, is also provided by the tuning and signal strength circuit 18 and is provided at terminal T16.

The hole detector circuit 20 is also coupled to the angle modulation detector 14 and provides a muting voltage at terminal 15 for utilization by an output amplifier.

By way of examples, the circuitry incorporated in the tuning and signal strength circuit 18 and in the hole detector circuit 20 may be of the types respectively described in concurrently filed copending applications Ser. No. 67,010 and Ser. No. 67,009 of Jack Avins and Jack Craft filed Aug. 26, 1970, and assigned to the same assignee as this invention.

Also included on the integrated circuit chip 200 is the biasing power supply 22 which provides the bias voltages for proper operation of the IF amplifier-limiter 12, the angle modulation detector 14, the output amplifier 16, the tuning and signal strength circuit 18, and the hole detector circuit 20, from the potential applied at terminal T14. An example of the type of biasing power supply 22 that may be used may be found in copending patent application Ser. No. 67,010 referred to above.

Figure 2:
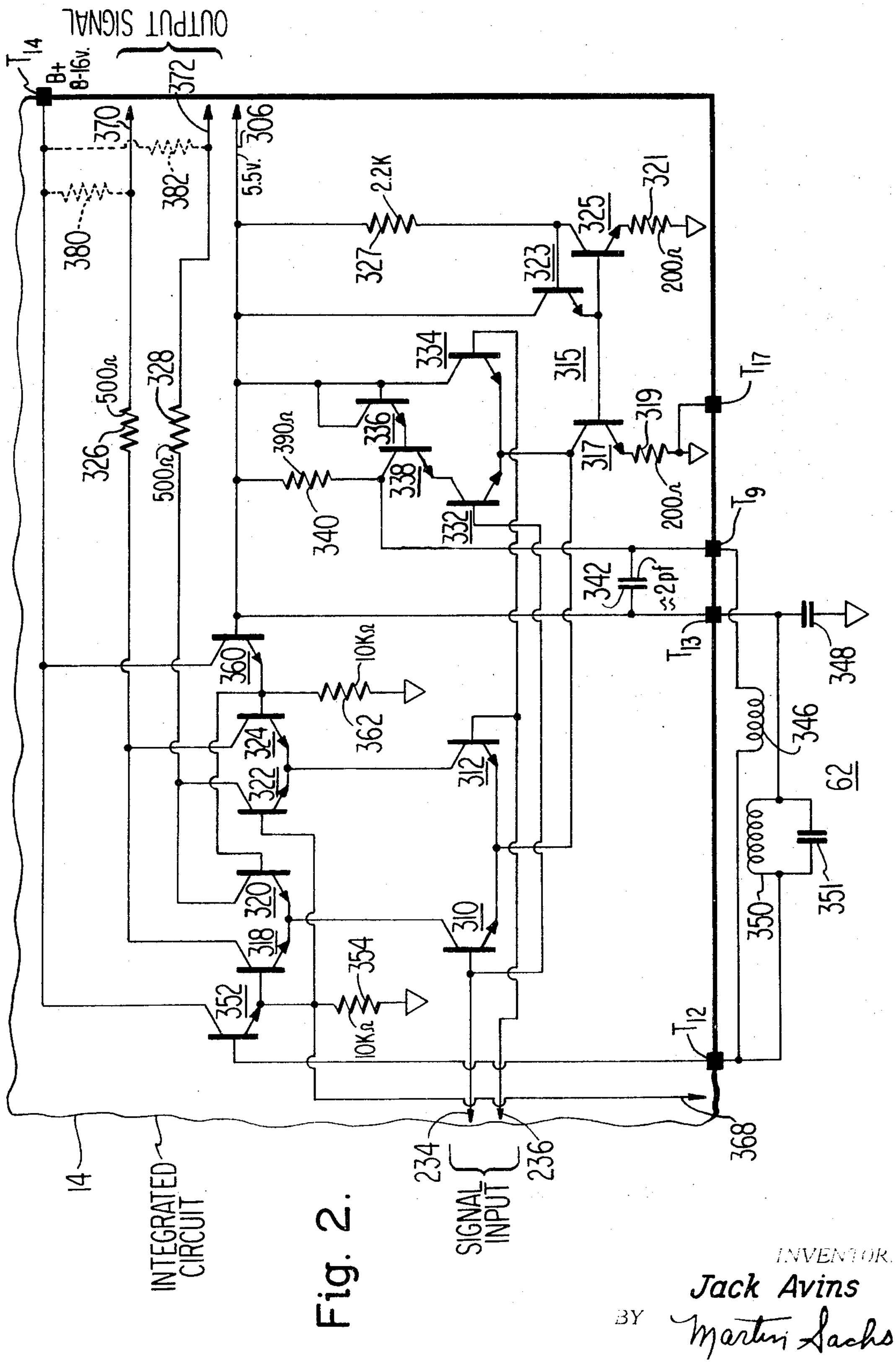
FIG. 2 is a schematic circuit diagram of a balanced angle modulation detector incorporating the principles of the present invention.

The angle modulation detector 14, incorporating the principles of the present invention, and associated circuitry are shown in FIG. 2. The detector is a quadrature detector including switching circuitry comprised of transistors 310, 312, 318, 320, 322, and 324. The reference frequency modulated (FM) signal wave from the amplifier-limiter 12 is applied in push-pull relation to the base electrodes of the transistors 310 and 312 via input points 234 and 236. The quadrature signal wave is applied in common to the base (first) electrodes of the transistors 318 and 322 as will be subsequently explained. The base electrodes of the transistors 320 and 324 are held at a fixed potential by the DC voltage at point 306 which is coupled through the base-emitter electrodes of transistor 360. The base electrode of transistor 360 is coupled to terminal T13 to which is also coupled capacitor 348 which functions to maintain the DC voltage.

The emitter (second) electrodes of transistors 310 and 312 are connected together and to a constant current source including transistor 317. The frequency modulated wave, coupled to points 234 and 236, switches the constant current flow between the transistors 310 and 312. In like manner, the quadrature signal switches the current flow through transistors 318 and 322 relative to the current flow through the transistors 320 and 324, respectively.

The phase of the quadrature signal changes as a function of the frequency modulation (deviation) of the applied signal wave. As a result, when transistor 310 conducts, the relative conduction angles of the transistors 318 and 320 into the load resistors 380 and 382 respectively, are a function of the signal modulation. Resistors 380 and 382 are dotted in the figure, since they represent the effective input impedances of the output amplifier 16, which is coupled across points 370 and 372.

In like manner, when transistor 312 conducts, the conduction time of transistor 322 relative to that of transistor 324 is also controlled by the signal modulation. The current from transistor 322 flows into the load resistor 382 through resistor 328 whereas current from transistor 324 flows through resistor 326 into load resistor 380.

To develop the quadrature signal, the in-phase or reference signal from points 234 and 236 is applied to the base electrodes of a pair of differentially connected transistors 332 and 334. The emitter electrodes of the transistors 332 and 334 are connected to the constant current source including the transistor 317. The collector electrode of the transistor 334 is connected to an operating potential connection 306 and the collector electrode of transistor 332 drives the emitter electrode of transistor 338. A fixed bias is applied to the base electrode of transistor 338 through a transistor 336 having its collector connected to its base electrode. The collector electrode of transistor 338 is connected to the operating potential supply connection 306 through a resistor 340. The collector electrode of transistor 338 is also connected to a terminal T9 of the integrated circuit chip 200.

Connected to terminals T9 and T13 is a phase shift network 62, comprising the above-mentioned resistor 340, located on the integrated circuit chip 200 and coupled to terminal T9, in combination with an inductor 346, and an inductor 350 connected in parallel with capacitor 351. Inductor 346 is connected in series with the parallel combination of inductor 350 and capacitor 351 between terminals T9 and T13.

The tuned circuit made up of capacitor 351, in parallel with inductor 350, resonates near the center frequency of the applied wave. Inductor 350, capacitor 351, and inductor 346 are external to the chip 200. In addition, a capacitor 342, which may comprise stray capacity appears between the terminals T9 and T13. The resonant frequency of the combination of capacitor 342, capacitor 351, inductor 346, and inductor 350 is adjusted to occur at the carrier frequency (zero deviation). A different carrier frequency causes a different phase shift through the phase shift network 62.

The signal developed at the junction of inductors 346 and 350 is applied through the terminal T12 to the base electrode of a transistor 352 which is connected as an emitter follower. The quadrature signal from the transistor 352 is developed across a resistor 354 and applied in common to the base electrodes of transistors 318 and 322. The signal across resistor 354 is also applied via conductor 368 to the hole detector circuit 20 shown in FIG. 1.

To complete the symmetry of the circuit, a transistor 360, connected as an emitter follower includes a load resistor 362. A direct voltage from point 306 is applied to the base electrode of the transistor 360 and also via terminal T13, through inductor 350 and terminal T12 to the base electrode of transistor 352. The voltage at the emitter electrode of transistor 360 is applied in common to the base electrode of transistors 320 and 324. The symmetry of the circuit insures that the direct voltage at the base electrodes of transistors 318, 320, 322, and 324 is the same, and the circuit will remain balanced even if the voltage on conductor 306 varies.

The constant current through transistor 317 is controlled by a circuit including transistors 323 and 325 and resistors 321 and 327. The transistors 317 and 325 are of like size and resistors 319 and 321 are equal. The base currents of these two transistors are equal and controlled by transistor 323, so that the collector current of transistor 317 is held at a value established by the resistor 327, which determines the collector current of transistor 325.

In operation, the output voltage of the detector, appearing between points 370 and 372, will vary from plus through zero to minus directly dependent upon the variations in the 90° phase shift between the in-phase signal wave and the quadrature signal wave. Therefore, if the quadrature relationship between the signal waves at the carrier frequency is not maintained, the zero output voltage will be offset resulting in an unbalanced detector characteristic. An unbalanced detector characteristic causes the positive and negative halves of the detected signal waves to be unsymmetrical, thereby introducing non-linear distortion to the recovered signal wave.

Figure 3A:
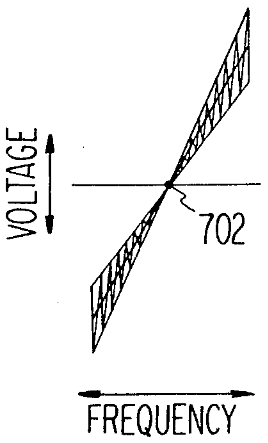
FIGS. 3A, 3B, and 3C are respective plots of the output of an angle modulation detector versus frequency.
Figure 3B:
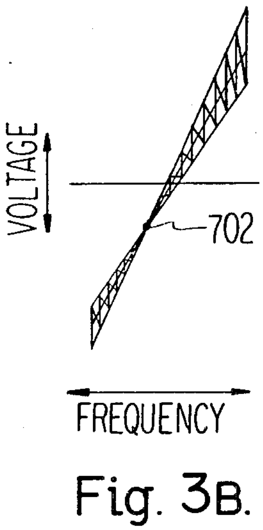
Figure 3C:
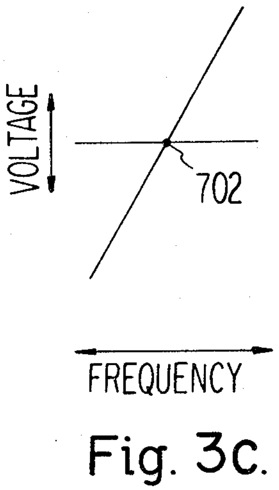

FIG. 3 is a plot of the detector output voltage versus frequency. With no modulation on an input carrier wave and a perfect quadrature relationship between the in-phase and quadrature signal waves appearing at the first and second inputs to the switching transistors 318, 320, 322, and 324, the average detector output voltage will be zero as described above. This is shown at crossover point 702 in FIGS. 3A and 3C.

A low level or weak signal wave, of insufficient amplitude to be limited and having both frequency and amplitude modulation thereon, will yield an output in accordance with FIG. 3A, if the quadrature relationship between the in-phase and quadrature wave is maintained. The change in output voltage at a given frequency is caused by the amplitude modulation of the frequency modulation signal wave envelope.

If the quadrature relationship between the signal waves in the in-phase and quadrature transmission circuit paths is not maintained, then the output voltage characteristic of the detector will be in accordance with FIG. 3B, which is typical for prior art detectors. It will be noted, that the crossover point 702 is shifted from the zero voltage axis which results in the non-linear distortion of the recovered signal wave, as mentioned earlier.

In the present embodiment of the invention, the detector is capable of maintaining a quadrature relationship between the modulated signal waves in the in-phase and quadrature signal wave paths, and has an output voltage versus frequency characteristic in accordance with FIGS. 3A and 3C. FIG. 3C shows the detector output characteristic when limiting is incorporated in both signal wave paths with the quadrature relationship being maintained from low signal levels to high signal levels.

Under weak signal conditions, the signal wave obtained from the output of IF amplifier-limiter 12 suffers from amplitude modulation of the frequency modulation signal wave envelope. Therefore, it is desirable to obtain as much additional limiting as possible in the detector circuit itself to reduce the amount of AM recovered on the detected signal. If transistors 310, 312, are driven sufficiently hard to contribute a substantial amount of limiting, asymmetries in the phase delay characteristics of the transistors themselves tend to degrade the AM suppression. The circuit arrangement of pairs transistors 310 and 312 and 332,334, each of which is referred to as a differential amplifier limiter or differential limiter overcomes this limitation.

The circuit in FIG. 2 is constructed to be symmetrical as described above, so that symmetrical (equal) limiting and equal phase delays take place in both the main signal wave path and the quadrature signal wave path. The equalization of delays in the two signal wave paths is exceedingly important, since it prevents the shift in the crossover point 702. As mentioned above, in the prior art a quadrature detector circuit driven directly from the input signal at low signal levels, may have a detector crossover point as shown at point 702 in FIG. 3B.

The amplitude modulation of the angle modulated signal wave envelope when coupled to transistors 310, 312, 332, and 334 is subjected to a non-linear phase delay, the magnitude of which, is a function of the amplitude of the signal wave envelope. Consequently, the phase delay for the crest and trough of the amplitude modulation is not equal. If this time delay difference is $\Delta t$, then the amount the signal wave is shifted in phase is given by:

$$\Delta\theta = \Delta t \times f \times 360°$$

where:

$\Delta\theta$ = the phase shift in degrees $\Delta t$ = time in seconds $f$ = frequency in Hz.

This has the same effect as tuning the phase shift network (62), $\Delta\theta$ degrees apart for the crest and trough of the AM modulation cycle. With equal non-linear phase delays introduced in both the in-phase and quadrature signal wave paths, as in the preferred embodiment of the present invention (FIG. 2), the effective dynamic detuning on the crest and trough of the Am modulation cycle is substantially eliminated.

The symmetrical arrangement of transistors 310, 312, 332, and 334 overcomes the problem of a shift in crossover point (FIG. 3B) with input signal wave level because any phase delay introduced in the in-phase signal wave path through transistors 310 and 312 is exactly offset by the delay in the quadrature signal wave path through transistors 332 and 334.

The decrease in delay is approximately 10° when transistors 310, 312, 332, and 334 are driven into hard limiting (strong signal operation). In prior art circuits the symmetrical arrangement of transistors 310, 312, 332, and 334 is not present, and the quadrature relationship between the signal waves in the in-phase and quadrature paths is destroyed with the cross over point 702 (FIG. 3B) shifting as the input level changes, from the below limiting level to the limiting level.

An additional increase of symmetry is obtained by the cascode load transistor 338 in the quadrature signal path. Thus, the non-linear delay of transistor 338 in the quadrature signal wave path has as its counterpart transistor 324 (or 318, 320, 322) in the in-phase signal wave path. As the signal level at the output of transistors 310, 312, 332 and 334 varies due to amplitude modulation, the non-linear delays are kept substantially equal.

The circuit arrangement described above results in a fixed delay difference at the collector (third) electrodes of switching transistors 318 and 322 between the in-phase and quadrature signal wave paths because the quadrature signal wave is applied to the input base (first) electrodes in order to control or gate the collector currents and the in-phase signal wave is applied to the emitter (second) electrodes.

This phase delay difference is compensated for, by the phase shift network 62 which introduces a phase lag, rather than the conventional lead network. In this way, the phase shift network lag is adjusted to be approximately 80°, rather than 90°, with the additional 10° being provided by the lag in driving the base electrode of switching transistors 318 and 322 with the quadrature signal wave. The additional 10° delay introduced between the base and collector electrodes of transistors 318 and 322 remains substantially fixed, since the signal waves reaching the base electrodes are always within the linear operating range for the usable input signal range.

More specifically, the input signal wave appearing at points 234 and 236, if of sufficient magnitude to have been limited by the intermediate frequency amplifier-limiter 12, would be substantially a square wave signal with steep wave fronts, and would not present the problem the present invention overcomes. When the input signal wave is of insufficient magnitude to obtain a sufficient amount of limiting in the amplifier-limiter 12, the voltage appearing at points 234 and 236 more closely resembles a sine wave with sloping sides. An approximate 10° phase shift is suffered by the sine wave when it is amplified in transistors 310 or 312, and appears at the emitter electrodes of the switching transistors 318 and 320; an additional approximate 3° phase shift is suffered by the sine wave when it appears at the collector electrodes of switching transistors 318 and 322.

The input signal wave is also coupled to transistors 332 and 334 which introduces a delay of 10°. This delay is equal to the delay introduced by transistors 310 and 312. The signal wave appearing at the collector electrode of transistor 332 is fed to the emitter electrode of transistor 338 and is subjected to approximately a 3° phase shift lag, when appearing at the collector of transistor 338. This phase shift lag is equal to the 3° phase shift lag introduced by switching transistors 318 and 322. The signal wave appearing at terminal T9 is coupled to inductors 346 and 350; and capacitor 351, which in conjunction with the collector load resistor 340, introduce a phase lag of approximately 80° with respect to the signal wave at terminal T9.

Therefore, the signal wave appearing at terminal T12 lags behind the in-phase signal wave by this amount. The signal wave at terminal T12 is subjected to a minimal delay when it is coupled via the base-emitter electrodes of transistor 352 to the base electrode of switching transistor 318. Here, however, the phase shifted signal wave undergoes a phase shift lag of an additional 10° when it is coupled from the base electrodes to the collector electrodes of transistors 318 or 322.

The sum total phase shift lag, therefore, includes the 10° introduced by transistors 332 or 334, which is equal to the 10° introduced by transistor 310 or 312. The 3° phase shift lag introduced by transistor 338 is equal to the 3° phase shift lag introduced by switching transistors 318 and 322. At this point, no contribution has been made to separate the phase relationship of the two signal waves. An additional phase shift lag of approximately 80° is introduced by inductors 346 and 350; capacitors 342 and 351, cooperating with resistor 340. Transistor 318 introduces approximately an additional 10° phase shift lag. This causes the phase shifted signal wave (Quadrature signal wave), referred to as the gating or control signal wave, to be essentially 90° behind the in-phase signal wave when both signal waves reach the collector electrodes of switching transistors 318 and 322.

The output signal currents occurring at points 370 and 372 are then coupled to a utilization means such as balanced output amplifier 16.

Accordingly, with the above described arrangement, a balanced FM detector circuit is disclosed which provides superior amplitude modulation rejection, an improved limiting threshold, and a minimum of non-linear distortion.

What is claimed is:

1. An angle modulation detection circuit comprising:

switching means having at least a reference signal input electrode, a quadrature signal input electrode and an output electrode;

means including at least a first input terminal for supplying angle modulated signals;

means providing a first angle modulation signal transmission circuit between said first input terminal and said reference signal input electrode;

means providing a second angle modulation signal transmission circuit between said first input terminal and said quadrature signal input electrode;

said first angle modulation signal transmission circuit including a first limiting amplifier having an undesired characteristic of phase delay variation as a function of input signal amplitude and said second angle modulation signal transmission circuit including a second limiting amplifier similar to said first and having a substantially equal phase delay characteristic;

further phase shifting means included in one of said first and second angle modulation signal transmission circuits for shifting the phase of said angle modulated signals conveyed therethrough such that, at a reference frequency, a substantially quadrature relationship is maintained between the signals from said first and second angle modulation signal transmission circuits as viewed from said output electrode for a range of signal amplitudes applied to said input terminal; and a load circuit coupled to said output electrode.

2. An angle modulation detector circuit according to claim 1 wherein one of said means providing an angle modulation signal transmission circuit comprises a first and second transistor arranged as a differential limiting amplifier and each having emitter, base, and collector electrodes, one of said collector electrodes being coupled to said reference signal input electrode of said switching means, one of said base electrodes being coupled to said first input terminal, said emitter electrodes being coupled together and constant current means coupled to said emitter electrodes for providing a constant current to said first and second transistors.

3. An angle modulation detector circuit according to claim 1 wherein said switching means comprises at least a first and second transistor having emitter, base, and collector electrodes, wherein said emitter and base electrodes correspond to said reference and quadrature signal input electrodes respectively, and said collector electrode corresponds to said output electrode.

4. An angle modulation detector circuit according to claim 3 wherein said means providing a second angle modulation signal transmission circuit comprises, at least a third and fourth transistor having base, emitter, and collector electrodes, said base electrode of said third transistor being coupled to said first input terminal; means coupling the collector electrode of said third transistor to the emitter electrode of said fourth transistor for providing an impedance characteristic substantially equal to the impedance characteristic coupled between said reference electrode and said first input terminal.

5. An angle modulation detector circuit according to claim 1 wherein said further phase shifting means comprises a network including a resistor and first inductor connected in series coupled to a capacitor and second inductor connected in parallel.

6. An angle modulation detector circuit according to claim 5 wherein said first and second angle modulation signal transmission circuits each comprise differential amplifier means for limiting said angle modulated signals.

7. An angle modulation detector circuit according to claim 1 wherein said switching means comprises at least four switching transistors and each of said first and second angle modulated signal transmission circuits includes at least two transistors arranged as a differential amplifier.

8. An angle modulation detector circuit according to claim 7 wherein said four transistors in said switching means are arranged in two differential pairs and a collector of one transistor in a first differential amplifier is connected to joined emitter electrodes of transistors in one of said pairs while a collector of the other transistor in said first differential amplifier is connected to joined emitter electrodes of transistors in the other of said pairs.

9. A balanced angle modulation detector circuit according to claim 8 wherein said further phase shifting means comprises a tuned network having a resistor and inductor connected in series coupled to an inductor and capacitor connected in parallel.

10. An angle modulation detector circuit according to claim 8 wherein said second differential amplifier includes a further transistor coupled in cascode between said second differential amplifier and said quadrature signal input of said switching means.

11. An angle modulation detector circuit according to claim 10 wherein said quadrature signal input of said switching means comprises a base electrode of at least one of said four switching transistors and said reference signal input is connected to at least the collector of one of said differential limiter transistors.

12. A balanced angle modulation detector circuit comprising:

a. a differential limiter circuit including first and second transistors each having base, emitter, and collector electrodes, said emitter electrodes being coupled to each other;
b. means for applying differentially related angle modulated input signals between the base electrodes of said first and second transistors;
c. means for applying a constant current between said emitters of said first and second transistors and a first terminal;
d. third, fourth, fifth, and sixth transistors each having base, emitter, and collector electrodes;
e. means coupling the collector electrodes of said third and sixth transistors to an operating potential supply terminal for providing the first half of a balanced detector load;
f. means coupling the collector electrode of said fourth and fifth transistors to said operating potential supply terminal for providing the second half of said balanced detector load;
g. means for coupling the collector electrode of said first transistor to the junction of said emitters of said third and fourth transistors;
h. means for coupling the collector electrode of said second transistor to the junction of said emitters of said fifth and sixth transistors;
i. an auxiliary differential limiter circuit including seventh and eighth transistors each having base, emitter, and collector electrodes;
j. means for applying said differentially related angle modulated input signal between the base electrodes of said seventh and eighth transistors;
k. means for applying said constant current means between the junction of said emitters of said seventh and eighth transistors and said first terminal;
l. means for coupling the collector electrode of said eighth transistor to a potential supply terminal;
m. means coupling the collector electrode of said seventh transistor to a potential supply terminal for providing an output load substantially equal to the load coupled to the collectors of said first and second transistors; and
n. means coupled between said output load and the base electrodes of said third and fourth transistors for providing a lagging phase shift to said input signals including a tuned network including a resistor and first inductor connected in series coupled to a second inductor and capacitor connected in parallel.

13. A balanced angle modulation detector circuit according to claim 12 wherein all of said components except said series inductor, said parallel inductor and capacitor are incorporated in a monolithic integrated circuit chip.

* * * * *

75